UNITED STATES PATENT OFFICE.

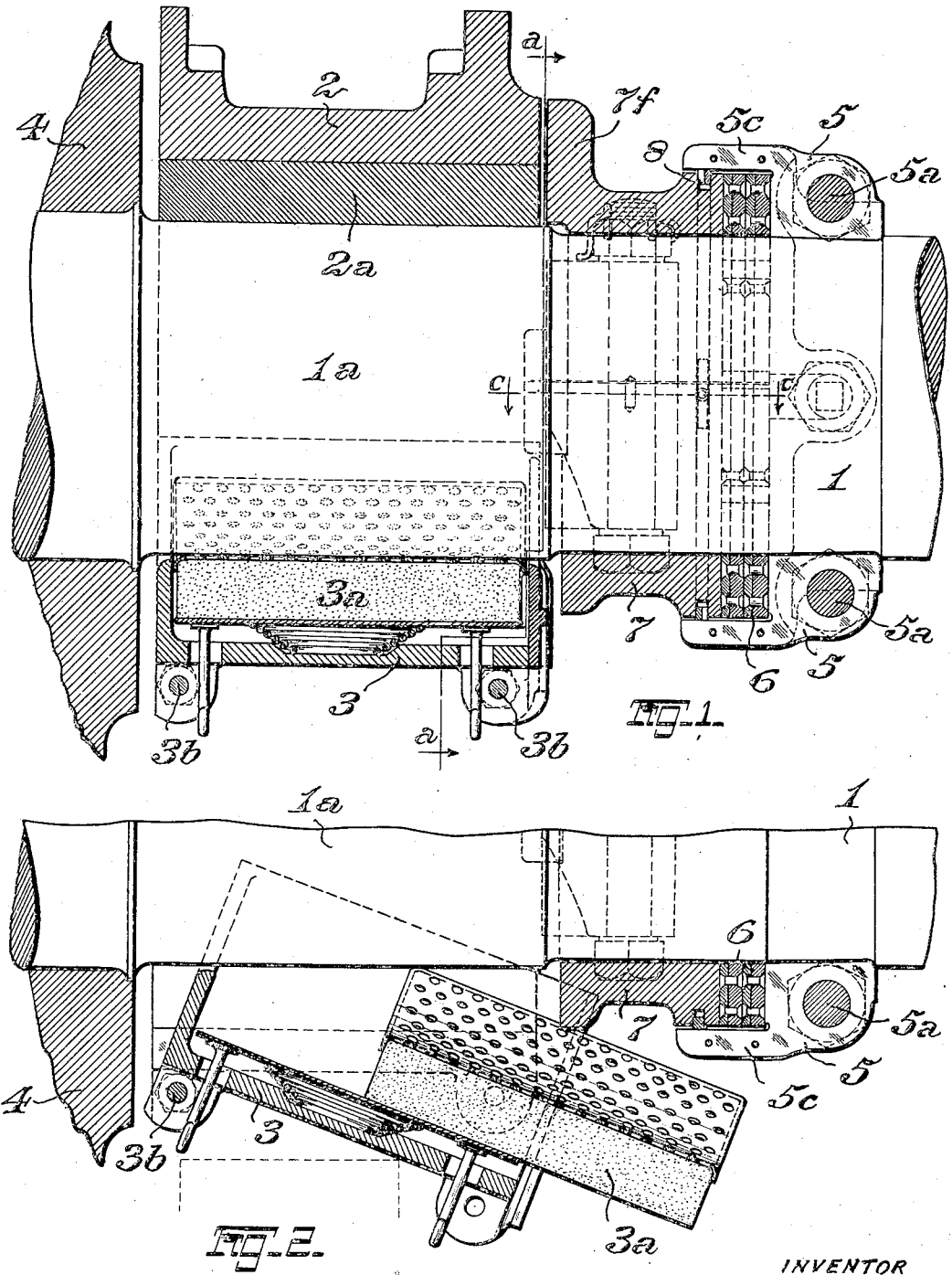

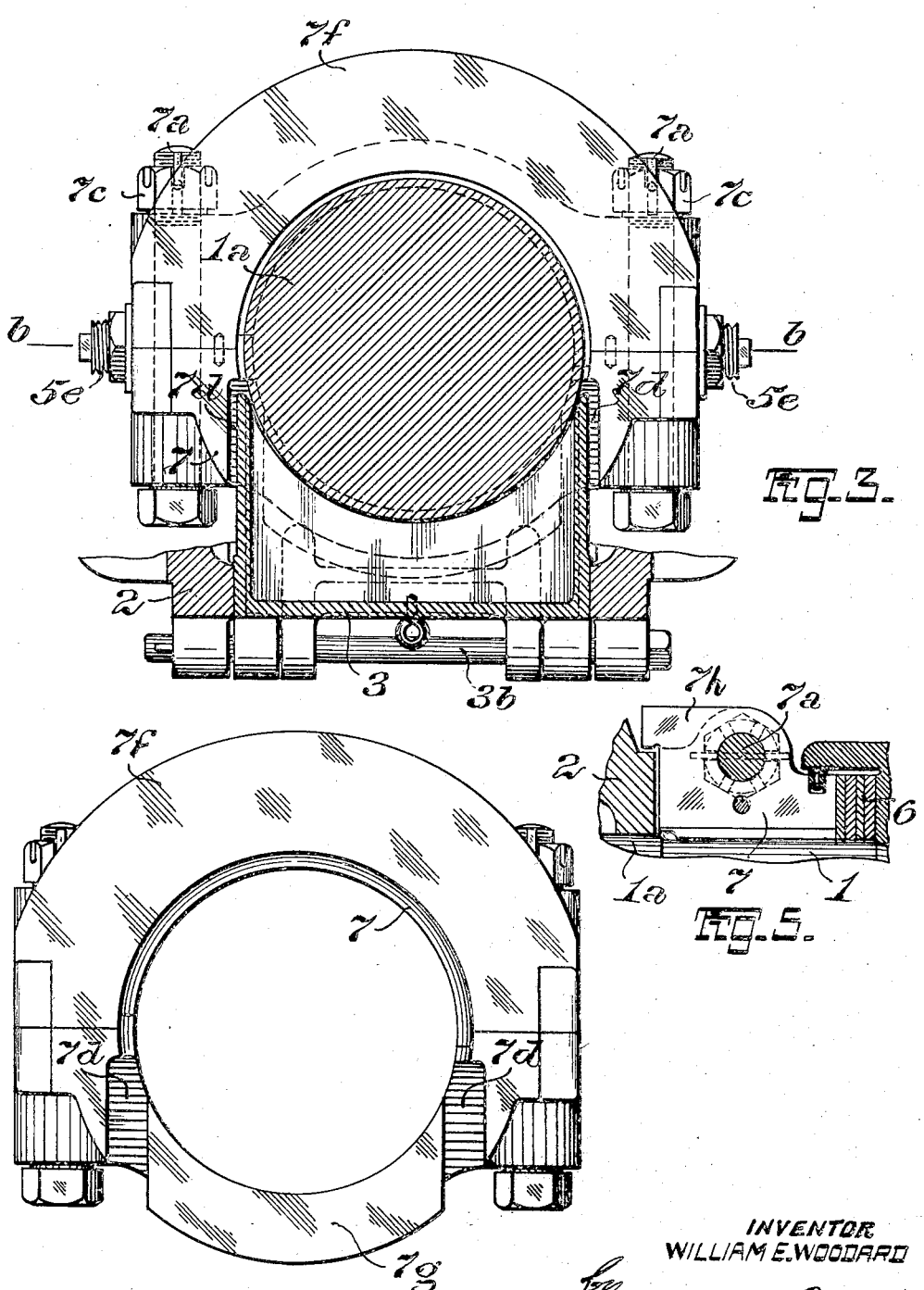

WILLIAM E. WOODARD, OF LIMA, OHIO.

LATERAL-THRUST-BEARING APPLIANCE FOR RAILROAD-AXLES.

1,380,456.     Specification of Letters Patent.    Patented June 7, 1921.

Application filed March 15, 1919. Serial No. 282,798.

*To all whom it may concern:*

Be it known that I, WILLIAM E. WOODARD, of Lima, in the county of Allen and State of Ohio, have invented a certain new and useful Improvement in Lateral-Thrust-Bearing Appliances for Railroad-Axles, of which the following is a specification.

My invention relates to a lateral thrust bearing mechanism in which the pressure resultant upon lateral motion of an axle bearing box, is applied for example to a bearing member fixed upon the axle of the box, through a transmission means interposed between the box and the bearing collar.

The object of my invention is to construct a mechanism of the above stated character in such a manner that the lubricant cellar of the axle bearing box may be quickly and conveniently repacked, whenever desired, without necessitating the removal of any of the members of the adjacent mechanism.

The improvement claimed is hereinafter fully set forth in the accompanying drawings, wherein—

Figure 1 is a vertical longitudinal central section through a lateral thrust bearing appliance, illustrating an application of my invention; Fig. 2, a similar section through the lower portion thereof, showing the lubricant cellar moved into position for the insertion of a cake of solid lubricant; Fig. 3, a transverse section on the line $a$—$a$ of Fig. 1; Fig. 4, an end view of the transmission ring, as seen from the left, and Fig. 5, a partial horizontal section on the line $b$—$b$ of Fig. 3.

In the practice of my invention, referring to the specific form or embodiment thereof in a lateral thrust bearing mechanism of the character shown applied in connection with a locomotive driving axle, the axle 1, carries, on each of its journals, $1^a$, a driving box, or axle bearing box 2, which is fitted with a bearing brass, $2^a$, and is recessed at the bottom to receive a lubricant cellar 3, which is detachably connected to it by bolts, $3^b$. The outer ends of the box and bearing brass are located adjacent to, but out of contact with, the driving wheel hub 4. The driving axle is reduced in diameter near the journals commencing a short distance from the inner end of each of the journals $1^a$, and extending sufficiently far along the axle to receive on its inner end portion, a fixed bearing member such as a collar 5. A transmission member such as a ring 7 is fitted freely on the axle, adjacent to the axle bearing box, and compound thrust rings 6, hereinafter described, or other antifriction means are preferably interposed between the fixed and loose members.

The bearing collar 5 is preferably formed in two abutting semi-annular sections, in order to be attachable to and detachable from, the axle, the sections being connected together and clamped firmly upon the axle, by transverse bolts, $5^a$, provided with suitable nuts. Circumferential flanges $5^c$ are formed on the sides of the collar sections nearer the axle box, said flanges abutting and forming a casing or housing in which two or more compound thrust rings 6, 6, each formed in two sections, for application to and removal from the axle, are fitted freely around it. Perforations are formed in the thrust rings, for the passage of lubricant, which is forced against and between them by screw plugs, $5^e$, closing lubricant cups, projecting from the periphery of the bearing collar 5. Adjustment to compensate for wear under lateral motion pressure is effected, as from time to time desired, by the removal of one or more of the compound thrust rings and the substitution of thicker rings.

Pressure resultant on lateral motion of the axle boxes 2, is imparted from each of them to the adjoining bearing collar 5, through a transmission ring 7, preferably formed in two semi-annular segments, for application to and removal from the axle, the segments being connected by transverse bolts $7^a$, each having a proper nut $7^c$, on one end. The semi-annular segments are arranged horizontally so that the bolts $7^a$ will be disposed substantially at right angles to the plane of the cellar box. The ring 7, which is fitted freely on the axle, is interposed between the compound thrust rings 6, against the nearer of which it normally abuts, and the inner end of the axle box, being normally spaced at a distance from the latter equal to substantially one half the lateral motion allowed to the driving boxes. A lubricant retaining ring 8, formed in two sections, which are lapped at their joints, is fitted in a circumferential groove in the portion of the transmission ring 7, which is inclosed by the thrust ring casing $5^c$, the segments being pressed outwardly, to maintain a tight joint between the rings 7 and 5, by spring means.

In order to provide ample bearing surface for the pressure of the inner end of the axle bearing box 2, on the adjacent end of the transmission ring 7, the diameter of the latter is increased by the formation thereon of a circumferential flange 7$^t$, which flange, if made continuous around the ring, would prevent the withdrawal of the lubricant cellar 3, for repacking, unless the ring should be previously removed. To obviate this objection, the circumferential face 7$^g$ of the lower section of the transmission ring 7, is spaced away from the inner faces of the boxes and cellar, said face extending between the two vertical gaps or recesses, 7$^d$, 7$^d$, which extend into the ring 7, said gaps being of sufficient width and spaced at proper distance apart to allow the side walls of the lubricant cellar 3, to pass freely through them, when the cellar is tilted downwardly, in which position a cake of solid lubricant 3$^a$, may be readily inserted in, or removed from, the lubricant cellar, as indicated in Fig. 2. The cellar can be so tilted by removing the cellar bolt 3$^b$, which is nearer the ring 7, and swinging the cellar on the other bolt, adjacent to its outer end, as a pivot.

The foregoing disposition of parts to accomplish the desired movement is made possible by the horizontal arrangement of the two segments comprising ring 7, and vertical position of bolts 7$^a$. By this arrangement the lower half of the bearing may be said to constitute a connecting member for connecting the ends of the upper half, said connecting member having at least a portion thereof of less width than the upper half so as not to interfere with the movement of the cellar.

My invention also provides means for positively preventing rotation of the transmission ring 7, with the axle, and thereby to constantly maintain it in normal relation, to the axle, bearing box 2, so that the gaps in the end of the ring shall always be properly positioned for the removal or insertion of the lubricant cellar. To this end a tongue or projection, 7$^h$, is formed on the inner end of one of the sections of the transmission ring, said tongue abutting on one side of the inner end of the axle bearing box, as shown in Fig. 5.

I claim:

1. In a lateral thrust bearing appliance for railroad axles, the combination of an axle; an axle bearing box fitted thereon with the capacity of relative longitudinal movement; a lubricant cellar coupled to said box; a bearing collar fixed on the axle; and a transmission ring mounted on the axle between the axle bearing box and the bearing collar composed of two parts, the part nearest the cellar being cut away relative to the other part to afford access to the cellar without removal of the ring.

2. In a lateral thrust bearing appliance for railroad axles, the combination of an axle; an axle bearing box fitted thereon with the capacity of relative longitudinal movement; a lubricant cellar coupled to said box, and a bearing element fixed on the axle, said element comprising a parti-annular member having a bearing surface and another member connecting the limbs of the first member but of smaller dimension whereby to afford access to the cellar box without removal of the bearing element.

3. In a lateral thrust bearing applicance for railroad axles, the combination of an axle; an axle bearing box fitted thereon with the capacity of relative longitudinal movement; a lubricant cellar coupled to said box; a bearing collar fixed on the axle; a transmission ring mounted on the axle, between the axle bearing box and the bearing collar; and constructed in one position to permit access to the cellar; and means to prevent rotation of said ring.

4. In a lateral thrust bearing appliance for railroad axles, the combination of an axle; an axle bearing box fitted thereon with the capacity of relative longitudinal movement; a lubricant cellar coupled to said box; a bearing collar fixed on the axle; a transmission ring mounted on the axle, between the axle bearing box and the bearing collar; and having a recessed portion in its end adjoining the axle bearing box, for the passage of the lubricant cellar; and a tongue on said ring, abutting on one side of the axle bearing box.

In testimony whereof, I have hereunto signed my name.

WILLIAM E. WOODARD.